United States Patent [19]

Asahara et al.

[11] 3,920,461

[45] Nov. 18, 1975

[54] GLASS MATERIAL HAVING A SWITCHING EFFECT

[75] Inventors: Yoshiyuki Asahara, Kawasaki; Tetsuro Izumitani, Hino; Hidemi Tajima, Akihima, all of Japan

[73] Assignee: Hoya Glass Works, Ltd., Tokyo, Japan

[22] Filed: July 30, 1973

[21] Appl. No.: 383,742

[30] Foreign Application Priority Data

Aug. 22, 1972 Japan .............................. 47-83858

[52] U.S. Cl. ........ 106/47 R; 106/47 Q; 252/62.3 S; 252/62.3 V

[51] Int. Cl.$^2$ ........................................... C03C 3/00

[58] Field of Search ........................ 106/47 Q, 47 R; 252/62.3 S, 62.3 V

[56] References Cited

UNITED STATES PATENTS

| | | | |
|---|---|---|---|
| 3,241,009 | 3/1966 | Dewald et al. | 106/47 R |
| 3,271,591 | 9/1966 | Ovshinsky | 106/47 R |
| 3,348,045 | 10/1967 | Brau et al. | 106/47 R |
| 3,371,210 | 2/1968 | Brau et al. | 106/47 R |

FOREIGN PATENTS OR APPLICATIONS

| | | | |
|---|---|---|---|
| 1,446,945 | 6/1966 | France | 252/62.3 V |

OTHER PUBLICATIONS

Hilton et al. — "Non-Oxide IVA-VA-VIA Chalcogenide Glasses"-Phys. & Chemistry of Glasses, 7-Aug. 1966, pp. 105-126.

Phillips et al. —"Structure and Electrical Properties of Chalcogenide Glasses" Conference-Proceedings Brit-CerSoc. Elec. and Magnetic Ceramics, Warwick, Staffs, Eng. pp. 293-302.

*Primary Examiner*—Winston A. Douglas
*Assistant Examiner*—John F. Niebling
*Attorney, Agent, or Firm*—Sughrue, Rothwell, Mion, Zinn & Macpeak

[57] ABSTRACT

A glass material having a memory or threshold switching effect which consists of 14.0 – 35.0 atomic % Ge, 20.0 – 30.0 atomic % As, 5.0 – 25.0 atomic % Se and 25.0 – 55.0 atomic % Te. This material is suitable for making thin films by a conventional direct evaporation method.

6 Claims, 6 Drawing Figures

GLASS MATERIAL HAVING A SWITCHING EFFECT

BACKGROUND OF THE INVENTION

1. FIELD OF THE INVENTION

The present invention relates to a glass material having a memory or threshold switching effect which is suitable for making a thin film by a conventional direct evaporation method.

2. DESCRIPTION OF THE PRIOR ART

A three-component glass material consisting of Ge-Se-Te has hitherto been known in this technical field, which material has a memory switching effect. This conventional glass material is characterized by its memory switching effect, that is to say, a voltage applied to a thin piece of the glass material is increased, when the resistance of the glass is rapidly reduced at a voltage higher than a certain voltage value (Vth), whereby the material switches to a low resistance state. In the case of threshold type switching, materials return to the high resistance state upon removal of the applied voltage, but in the case of memory type switching, the low resistance is maintained in the material even after the removal of the applied voltage. The glass material can be returned to a high resistance state by the application of a high current pulse ("reset"). This glass system has a fairly large glass formation region in that it can be rich in a Se content (more than 30 atomic % of Se - the percentages showing respective components in this specification means an atomic percentage -), i.e., that is, glass formation is possible in the range of 0 – 40% Ge, 0 – 50% Te and 30 – 100% of Se. Further, the glass itself is stable. Thus, various glass materials which transmit infra-red have been prepared from the above glass system. These conventional materials, however, have a high electric resistance and thus the Vth thereof is also high. Under such circumstances, these materials are not suitable as a switching element substance.

On the other hand, a glass material of the Ge-Se-Te type which is rich in Te has a low electric resistance and thus the Vth thereof is low. By virtue of such fact, such a glass material is considered to have advantageous characteristics which are favorable in a switching element substance. However, the glass formation range of such a glass rich in Te is rather narrow, i.e., in the range of 15 – 30% Ge, 5–30% Se and 50–70% Te. In such a glass the Ge content is decreased depending upon the increase of Te, and thus the glass made of such constitution becomes unstable. Such a glass material involves the defect, with respect to the memory switching characteristics thereof, that the "reset" ability thereof is poor. Moreover, in view of the practical necessity that these glass materials are to be incorporated into an IC for use, and it is necessary to make a thin film thereof, it is difficult to make a thin film which has an electrically stable characteristic from glass materials containing a large Te content, since the Te is apt to volatilize during a conventional direct evaporation method, when the composition is rich in Te. As a result, it is necessary to employ a Spatter method for making thin films, and this procedure for preparing thin films is complicated and requires a long period of time.

SUMMARY OF THE INVENTION

The present invention is based upon the discovery that by the addition of a large amount of As into a Ge-Se-Te type glass material as described above constitution, the glass formation region can be broadened even with a Te rich composition, and the glass prepared from such a composition is stable, and in the range of less than 60% Te a thin film can be prepared therefrom by means of a conventional direct evaporation method, which film exhibits stable electrical characteristics. The present invention thus provides a novel glass material which has a switching effect of the threshold type of good repeatability and reproducibility or the memory type depending upon the composition of the glass material.

The glass material of the present invention consists of 14–35 atomic % Ge, 20–30 atomic % As, 5–25 atomic % Se and 25–55 atomic % Te.

Most preferred materials in accordance with the present invention consist of 14.0–29.0 atomic % of Ge, 7.0–18.0 atomic % Se, 28.0–50.0 atomic % Te and 23.0–29.0 atomic % As.

Figure 1:
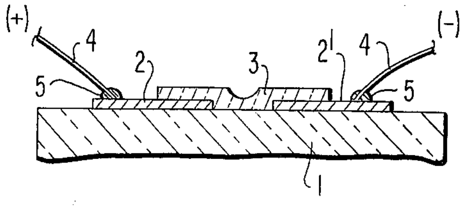
FIG. 1 is a schematic section of a coplanar type (Co) electrode configuration.

In these drawings, 1 is a glass substrate, 2 and 2' are gold electrodes, 3 is a glass sample, 4 is a conductive lead, 5 is a electro-conductive paste, E is an electric power, C is a capacitor, $R_L$ is a load resistor, $R_S$ is a standard resistor, and $S_1$, $S_2$ and $S_3$ are switches.

DESCRIPTION OF THE PREFERRED EMBODIMENTS

The present invention will now be explained in more detail by several working Examples. The following Tables show experimental data measured using samples of various kinds of glass materials of the present invention which are deposited on a glass substrate by a direct vacuum evaporation method. The direct vacuum evaporation was conducted using standard art techniques, that is, glass pieces were charged in a high vacuum silica crucible (7 mm diameter, 3–5 mm height). The glass pieces were electrically melted using a tungsten filament and then evaporated. The vapors condensed and deposited on the surface of the substrate as a thin film.

In the present specification, the term "repeatability" means a degree to which when the switch or memory is repeatedly operated the system repeatedly shows the same properties, e.g., Vth, resistance in the low or high resistance state, Ron or Roff, resistance on the memory state, etc.

$$\text{repeatability} = \frac{[\text{characteristic values}] - [\text{mean value}]}{[\text{mean value}]}$$

| Sample No. | Ingredients (atomic %) Ge | As | Se | Te | Threshold voltage value Vth (V) | High-resistance state LogRoff (Ω) | Low-resistance state Log Ron (Ω) |
|---|---|---|---|---|---|---|---|
| 1 | 15.4 | 23.1 | 7.7 | 53.8 | 250 | 6.5 | 4.5 |
| 2–1 | 15.4 | 23.1 | 11.5 | 50.0 | 350 | 7.6 | 4.0 |
| 2–2 | " | " | " | " | 30 | 6.0 | 4.3 |
| 3 | 14.3 | 28.6 | 17.9 | 39.2 | 28 | 6.3 | 4.5 |
| 4 | 14.3 | 28.6 | 21.5 | 35.7 | 77 | 8.0 | 5.5 |
| 5 | 23.1 | 23.1 | 11.5 | 42.3 | 30 | 6.8 | |
| 6 | 21.4 | 28.6 | 17.9 | 32.1 | 75 | 7.8 | |
| 7 | 21.4 | 28.6 | 14.3 | 35.7 | 35 | 7.6 | |
| 8 | 14.3 | 28.6 | 10.7 | 46.4 | 12.5 | 4.8 | |
| 9 | 14.3 | 28.6 | 7.1 | 50.0 | 2.2 | 4.6 | |
| 10 | 25.0 | 28.6 | 14.3 | 32.1 | 13 | 6.0 | |
| 11 | 25.0 | 28.6 | 10.7 | 35.7 | 12.5 | 5.5 | |
| 12 | 28.6 | 28.6 | 10.7 | 32.1 | 15.0 | 5.0 | |
| 13 | 32.1 | 28.6 | 10.7 | 28.6 | 10.0 | 4.4 | |
| 14 | 32.1 | 28.6 | 7.1 | 32.1 | — | 4.8 | |

| Sample No. | Memory state Log RM (Ω) | Load resistance (Ω) | Repetition tested numbers | Electrode type | Switch type |
|---|---|---|---|---|---|
| 1 | | $4 \times 10^5$ | 100 | Co | TS |
| 2–1 | | $2 \times 10^5$ | 50 | Co | TS |
| 2–2 | | $2 \times 10^4$ | 500 | S | TS |
| 3 | | $6 \times 10^4$ | 50 | S | TS |
| 4 | | $4 \times 10^5$ | 200 | S | TS |
| 5 | 3.2 | $2 \times 10^5$ | 10 | S | M |
| 6 | 4.8 | $4 \times 10^5$ | 20 | S | M |
| 7 | 5.4 | $4 \times 10^5$ | 10 | S | M |
| 8 | 4.0 | $2 \times 10^5$ | 40 | S | M |
| 9 | 2.5 | $8 \times 10^4$ | 20 | S | M |
| 10 | <4.0 | $2 \times 10^5$ | 15 | S | M |
| 11 | 2.8 | $10^5$ | 100 | S | M |
| 12 | 2.8 | $10^5$ | 40 | S | M |
| 13 | 1.0 | $10^5$ | 30 | S | M |
| 14 | 3.0 | $10^3$ | 15 | S | M |

Figure 2:
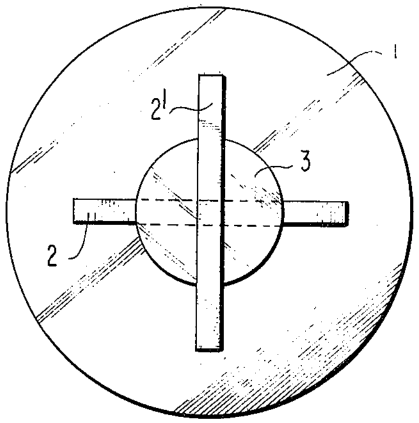
FIG. 2 is a top plan view of a sandwitch type (S) electrode configuration.

The configuration of the electrodes used in these Examples is shown in FIG. 1 (coplanar type - Co) and in FIG. 2 (sandwich type - S).

Referring to FIG. 1, the Co-type electrode configuration comprises gold electrodes 2 and 2′ deposited on glass substrate 1 so as to face each other by a vacuum evaporation method, a glass sample 3 which is deposited by a vacuum evaporation method so as to cover and a conductive lead 4 adhering to each electrode by means of electroconductive paste 5.

Figure 3:
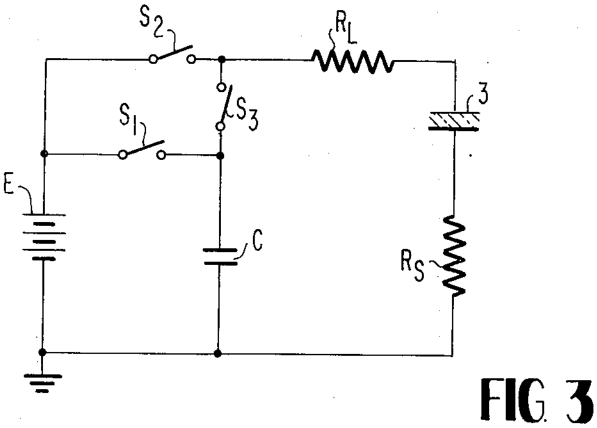
FIG. 3 is a top plan view of a measuring apparatus circuit.

Referring to FIG. 2, the S-type electrode configuration comprises a glass sample 3 which is put between crossed electrodes 2 and 2′ on a glass substrate 1, the sample and the electrodes having been deposited in order by a vacuum evaporation method. In the above Table, the column "electrode type" shows the kind of the electrode (Co-type or S-type) used in the respective examples. Referring to FIG. 3, the circuit of the apparatus used for the measurements comprises a sample 3, an electric power source E, a capacitor C, a load resistor $R_L$, a standard resistor $R_S$ and switches $S_1$, $S_2$ and $S_3$.

In Example Nos. 1–4 wherein a glass sample 3 having a threshold type switching effect is used, switch $S_1$ in the measuring apparatus circuit of FIG. 3 is shut while switches $S_2$ and $S_3$ in the same circuit are opened to thereby charge the capacitor C with a determined voltage. Thereafter switch $S_1$ is opened while switch $S_3$ is shut to thereby discharge the capacitor across sample 3, whereupon the resistance of the sample 3 switches to a low resistance state (Ron). When the discharged voltage is lowered, sample 3 reverts to its original high resistance state (Roff).

Figure 4:
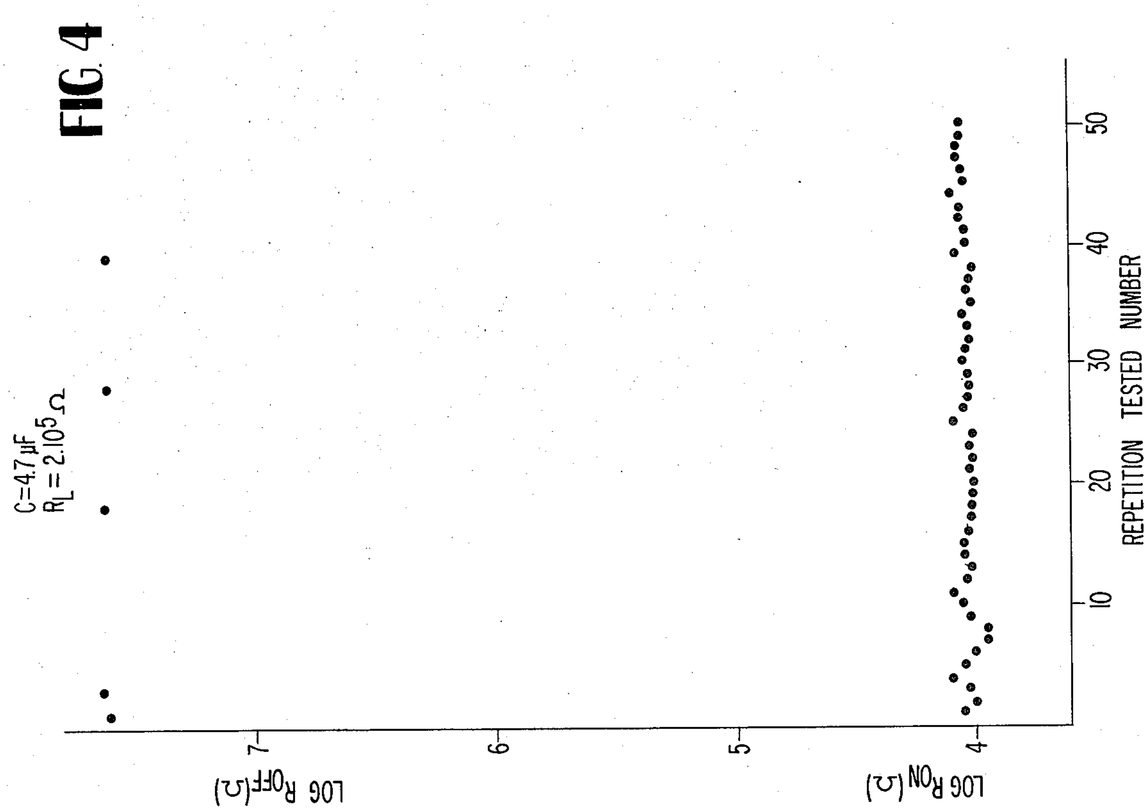
FIG. 4 is a graph which shows the repeatability characterisitics of a threshold type switching material using a sample of Example 2–1 hereunder described.

FIG. 4 graphically shows an embodiment of the Ron-Roff repeatability characteristic, the sample of Example 2-1 being used. The dispersion of the respective resistance states, i.e., Ron and Roff, is 0.26 and 3.7% respectively. This means the glass has a good repeatability. In this case, the capacitor C was 4.7 $\mu$F and the load resistor $2 \times 10^5 \Omega$.

Figure 5:
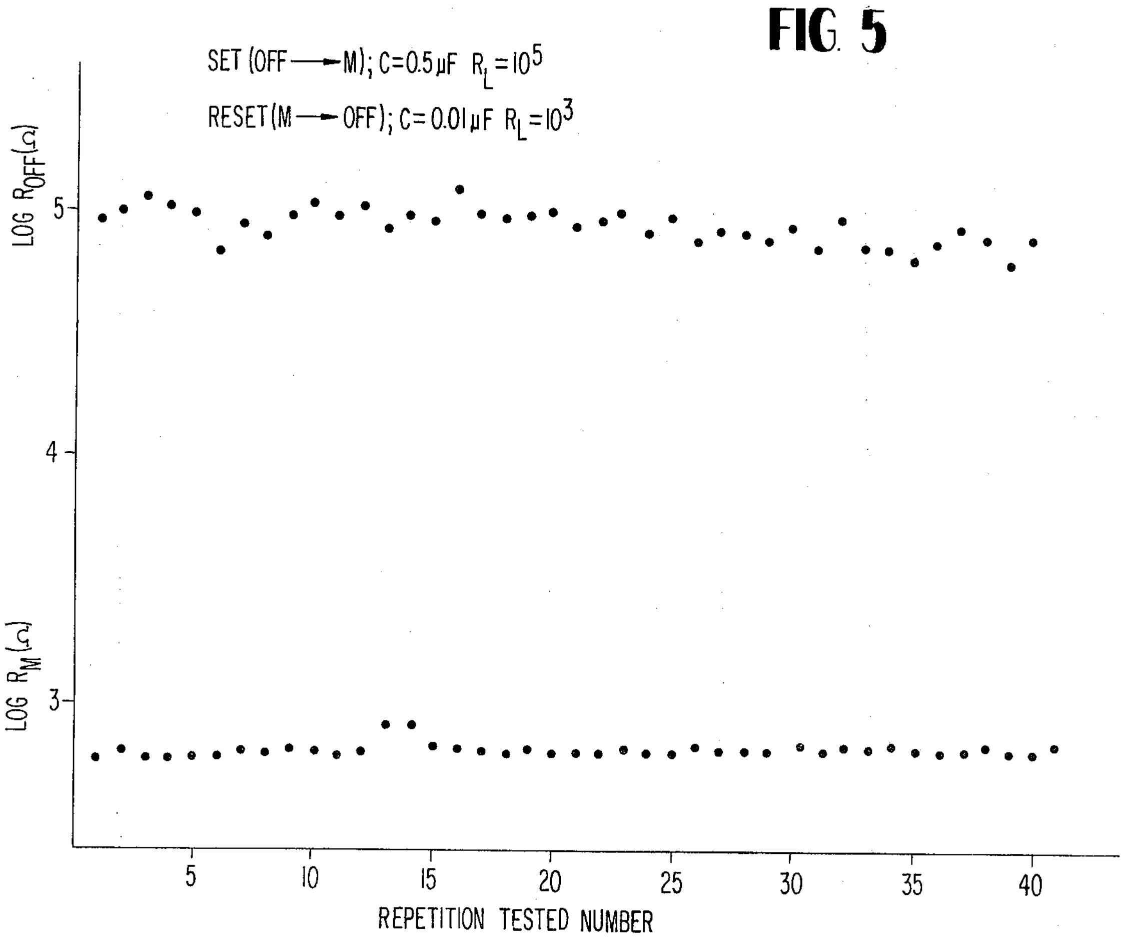
FIG. 5 is a graph which shows the repeatability characterisitic of a memory type switching material using a sample of Example 12 hereunder described.

In Example Nos. 5–14 wherein glass sample 3 having a memory type switching effect is used, switch $S_1$ in the measuring apparatus circuit of FIG. 3 is shut while switches $S_2$ and $S_3$ in the same circuit are opened to thereby charge the capacitor C with a determined voltage. Thereafter, switch $S_1$ is opened while switch $S_3$ is shut to thereby discharge the capacitor across the sample, whereupon the resistance of sample 3 switches to a low resistance state ($R_M$). In this case, sample 3 keeps its low resistance state ($R_M$) after the discharge voltage impressed thereto has lowered. Next, the load resistance $R_L$ is selected to be small resulting in an application of high voltage, and a discharged current is run for a short time using a capacitor whose capacity is smaller than that of capacitor C used in the above which means an application of short time pulse, whereby sample 3 in a low resistance state reverts again to its original high resistance state ($R_{off}$). Summarily, the memory thereof can be removed applying a pulse current having a high voltage for a short period of time. FIG. 5 graphically shows an embodiment of the Ron-Roff repeatability characteristic, the sample of Example 12 being used. It can be understood from FIG. 5 that both of the states $R_M$ and $R_{off}$ are stable, and repetition therebetween is possible.

Figure 6:
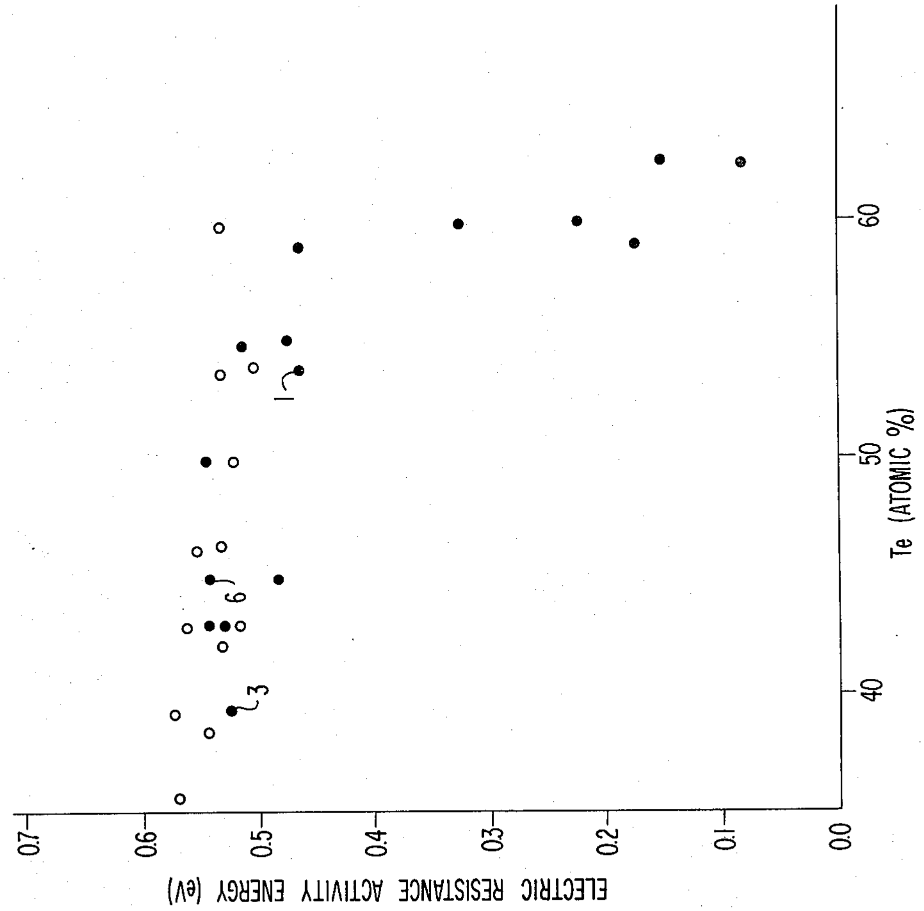
FIG. 6 is a graph which shows the variation of electric resistance activation energy with respect to Te content.

FIG. 6 shows a comparison between the variation of the electric resistance activation energy of a thin film prepared from a Ge-As-Se-Te system glass material by of a conventional vacuum evaporation method (shown in the graph by the filled circle black marks ● ) and the electric resistance activation energy of the original bulk thereof (shown in the same graph by the blank circle white marks O ), both cases depending upon the variation of the amount of Te in the glass material. It can be understood from FIG. 6 that in the glass containing less than 60% Te the electric resistance activation energy of the thin film is almost same as that of the original bulk thereof, which means that in such a composition range the glass composition itself does not vary widly due to the evaporation procedure used in making the thin film, and that in a glass containing more than 60% Te the electric resistance activation energy of the thin film is extremely small as compared with that of the original bulk thereof, which means that in such a composition range the glass composition itself varies widely, particularly with respect to the Te content, due to the evaporation procedure.

The numbers added to the black marks in FIG. 6 show the corresponding samples in the preceding Examples.

In the glass material of the present invention which consists of Ge-As-Se-Te, a content of at least 20% As is essential, that is, if the As content is less than 20%, the As is substantially ineffective, and thus the resulting glass unstable similar to a conventional Ge-Se-Te system glass material. Further, the repetition reset characteristic thereof is poor, and the lower resistance state is permanently retained as such after switching. A content of As of at most 30% is also essential in the present glass material, that is, at an As content of more than 30%, the glass formation region is narrowed and the content of Ge is limited thereby, Ge being an essential component for the purposes of improving the thermal, mechanical and chemical resistances of the glass material, which resistances are necessary to make a thin film from the glass material.

With respect to the component Ge, a content of at least 14% but at most 35% of Ge is essential, that is, range at Ge contents less than 14%, an improvement in the mechanical, chemical and thermal resistances cannot be efficiently attained in the resulting glass material, and range at a Ge content of more than 35%, glass formation is impossible.

Se and Te may be substituted mutually for each other. The Te content is limited to at most 55% because of the reasons advanced in the explanation of FIG. 6. A content of at least 25% Te is essential, however, because at a Te content of less than 25% the electric resistance of the resulting glass is too large and the Vth thereof is too high, the resulting glass being unsuitable for practical use. With respect to the Se content, at least 5% but at most 25% of the same is essential, that is, at less than 5% of Se glass formation is impossible, while at more than 25% of Se the Te content is relatively reduced and the electric resistance of the resulting glass becomes too high so that the glass is not suitable for practical use.

The switching element substance of the present invention can be prepared by introducing the respective raw materials in their powder form into a quartz tube having an inner diameter of 6 mm and a length of about 40 mm, sealing the tube under vacuum, melting the raw materials in the tube at about 900°C for 5 hours, leaving the thus treated tube in air to spontaneously cool the same, and thereafter taking out the resulting material from the quartz tube. From these materials thus prepared, it is possible to make a thin film by a conventional vacuum evaporation method. At a thin film thickness of about 2 to about 3 $\mu$, the memory effect is particularly excellent. This range is not, of course, limitative.

While the invention has been described in detail and with reference to specific embodiments thereof, it will be apparent to one skilled in the art that various changes and modifications can be made therein without departing from the spirit and scope thereof.

What is claimed is:

1. A glass material having a memory type or threshold type switching effect, which consists of 14.0–35.0 atomic % of Ge, 20.0–30.0 atomic % of As, 5.0–25.0 atomic % of Se and 25.0–55.0 atomic % of Te.

2. A glass material as claimed in claim 1 which consists of 14.0–29.0 atomic % of Ge, 23.0–29.0 atomic % of As, 7.0–18.0 atomic % Se and 28.0–50.0 atomic % Te.

3. A switching element glass substance having a memory type or threshold type switching effect, which is prepared from a glass material consisting of 14.0–35.0 atomic % of Ge, 20.0–30.0 atomic % of As, 5.0–25.0 atomic % of Se and 25.0–55.0 atomic % of Te.

4. A switching element glass substance as claimed in claim 3 which consists of 14.0–29.0 atomic % of Ge, 23.0–29.0 atomic % of As, 7.0–18.0 atomic % Se and 28.0–50.0 atomic % Te.

5. A glass thin film having a memory type or threshold type switching effect which is prepared from a glass material consisting of 14.0–35.0 atomic % of Ge, 20.0–30.0 atomic % of As, 5.0–25.0 atomic % of Se and 25.0–55.0 atomic % of Te.

6. A glass thin film as claimed in claim 5 which is prepared from a glass material consisting of 14.0–29.0 atomic % of Ge, 23.0–29.0 atomic % of As, 7.0–18.0 atomic % Se and 28.0–50.0 atomic % Te.

* * * * *